United States Patent
Taira (10) Patent No.: US 6,637,236 B2
(45) Date of Patent: Oct. 28, 2003

(54) REFRIGERATING DEVICE

(75) Inventor: Shigeharu Taira, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/168,851

(22) PCT Filed: Dec. 18, 2000

(86) PCT No.: PCT/JP00/08953
§ 371 (c)(1),
(2), (4) Date: Jun. 26, 2002

(87) PCT Pub. No.: WO01/48428
PCT Pub. Date: Jul. 5, 2001

(65) Prior Publication Data
US 2002/0189280 A1 Dec. 19, 2002

(30) Foreign Application Priority Data

Dec. 28, 1999 (JP) ............................................. 11-373347
Jul. 31, 2000 (JP) ....................................... 2000-230933

(51) Int. Cl.⁷ .............................. F25B 1/00; F25D 21/12
(52) U.S. Cl. ............................... 62/502; 62/114; 252/67
(58) Field of Search ........................... 62/114, 115, 467, 62/498, 502

(56) References Cited

U.S. PATENT DOCUMENTS 6,189,322 B1 * 2/2001 Ishihara et al. ............... 62/114
6,258,293 B1 * 7/2001 Iizuka et al. ................... 252/68
6,261,474 B1 * 7/2001 Egawa et al. .................. 252/68

FOREIGN PATENT DOCUMENTS

| JP | 5-3855 U | 1/1993 |
| JP | 9-151370 A | 6/1997 |
| JP | 9-208939 A | 8/1997 |
| JP | 10-195426 A | 7/1998 |
| WO | 98/41803 A1 | 9/1998 |
| WO | 00/52396 A1 | 9/2000 |

OTHER PUBLICATIONS

Shadan Hojin Nippon Reito Kyokai ed., p. 133, right column, line 8 to p. 143, right column, line 26 (1988).

* cited by examiner

Primary Examiner—Henry Bennett
Assistant Examiner—Malik N. Drake
(74) Attorney, Agent, or Firm—Birch, Stewart, Kolasch & Birch, LLP (57) ABSTRACT

A refrigerating device circulating R32 in a refrigerant circuit as a refrigerant to perform a refrigerating cycle, the refrigerating device comprising a compressor in the refrigerant circuit, a first heat exchanger serving as a condenser, an expansion means and a second heat exchanger serving as an evaporator, wherein a ratio m of an internal volume (Vout) of the first heat exchanger to an internal volume (Vin) of the second heat exchanger is set to be in a range of $0.7 \leq m \leq 1.5$.

2 Claims, 7 Drawing Sheets

Fig.3A

| R32 | REFRIGERATING CAPACITY | | |
|---|---|---|---|
| | 2.5kW | 2.8kW | 5.0kW |
| m=Vout/Vin | 0.912 | 0.954 | 1.335 |
| INDOOR HEAT EXCHANGER VOLUME RATIO | 52.3% | 51.2% | 42.8% |
| THEORETICAL COP RATE (COOLING OPERATION) | 106.5% | 109.3% | 121.2% |

Fig.3B

| CONVENTIONAL REFRIGERANT(R22,R410A) | REFRIGERATING CAPACITY | | |
|---|---|---|---|
| | 2.5kW | 2.8kW | 5.0kW |
| m=Vout/Vin | 1.676 | 1.736 | 2.269 |
| INDOOR HEAT EXCHANGER VOLUME RATIO | 37.4% | 36.6% | 30.6% |
| THEORETICAL COP RATE (COOLING OPERATION) | 106.5% | 109.3% | 121.2% |

REFRIGERATING DEVICE

This application is the national phase under 35 U.S.C. §371 of PCT International Application No. PCT/JP00/08953 which has an International filing date of Dec. 18, 2000, which designatied the United States of America.

TECHNICAL FIELD

The present invention relates to a refrigerating device. More specifically, the present invention relates to a refrigerating device using R32 (chemical formula $CH_2F_2$) or a mixed refrigerant containing at least 70% by weight of R32 as a refrigerant alternative to R22 (chemical formula $CHClF_2$)

BACKGROUND ART

Challenges for protection of global environment relating to a refrigerating device and an air conditioner using a refrigerant to perform a refrigerating cycle include (1) protection of the ozone layer, (2) energy saving, (3) response to global warming (restricted emission of $CO_2$ or the like) and (4) recycling of resources. Particularly in view of protection of the ozone layer among these challenges for protection of global environment, R22 (HFC22) is not considered to be a favorable refrigerant due to its high ODP (Ozone Depletion Potential). Candidates of a refrigerant alternative to R22, which has a high ozone depletion potential, include R410A (having a composition of HFC32:HFC125=50:50 in weight ratio), R407C (having a composition of HFC32:HFC125:HFC134a=23:25:52 in weight ratio), R32 (HFC32) and so forth. Furthermore, some of refrigerating devices using R410A or R407C to perform a refrigerating cycle which can obtain a COP (Coefficient of Performance) equivalent to that of R22 are already commercially available.

However, when R410A or R407C is used, the size of a heat exchanger serving as a condenser needs to be increased in view of energy saving in comparison with the case where R22 is used. In particular, when R410A is used, this tendency becomes strong since the degree of supercooling (subcool (deg.)) in the condenser needs to be increased. Therefore, conventionally, the ratio m (=Vout/Vin) of the internal volume Vout of a heat exchanger serving as a condenser and the internal volume Vin of a heat exchanger serving as an evaporator is set to be higher than 1.5. As a result, there are disadvantages in costs and product size. In particular, as in the case of an air conditioner, when a heat pump cycle is also performed by circulating the refrigerant in a direction opposite to the refrigerating cycle, the refrigerant circuit needs to include a large-size liquid receiver (receiver) and a large-size vapor-liquid separator (accumulator) because optimal amounts of the refrigerant filled in the refrigerant circuit at the time of cooling and heating are largely different. Therefore, there are further disadvantages in costs and product size.

Accordingly, it is suggested to use R32 (HFC32) instead of R410A or R407C. R32 has a Global Warming Potential GWP which is about ⅓ of that of R22, R410A or R407C, and therefore R32 is extremely effective for preventing global warming. However, the COP of R32 cannot become higher than that of R22 while the COP of R407C or R410A is substantially equivalent to that of R22. In other words, a refrigerating device using R32 in a refrigerating cycle has not practically obtained a COP which greatly exceeds that of R22 although a high COP can be theoretically expected from characteristics of R32. Furthermore, R32 exhibits the phenomena that pressure and discharge temperature are higher as compared with the case of using R22. In addition, there is a problem that safety consensus is hardly reached since R32 has microcombustion property. Therefore, R32 has not been used in an actual product as an alternative refrigerant in industries.

DISCLOSURE OF INVENTION

Accordingly, an object of the present invention is to provide an energy saving type refrigerating device responding to global warming in which, by using R32 having a low global warming potential (GWP) as a refrigerant, a heat exchanger can be made smaller than a conventional device one while a coefficient of performance (COP) higher than that of a conventional device is obtained.

Figure 5A:
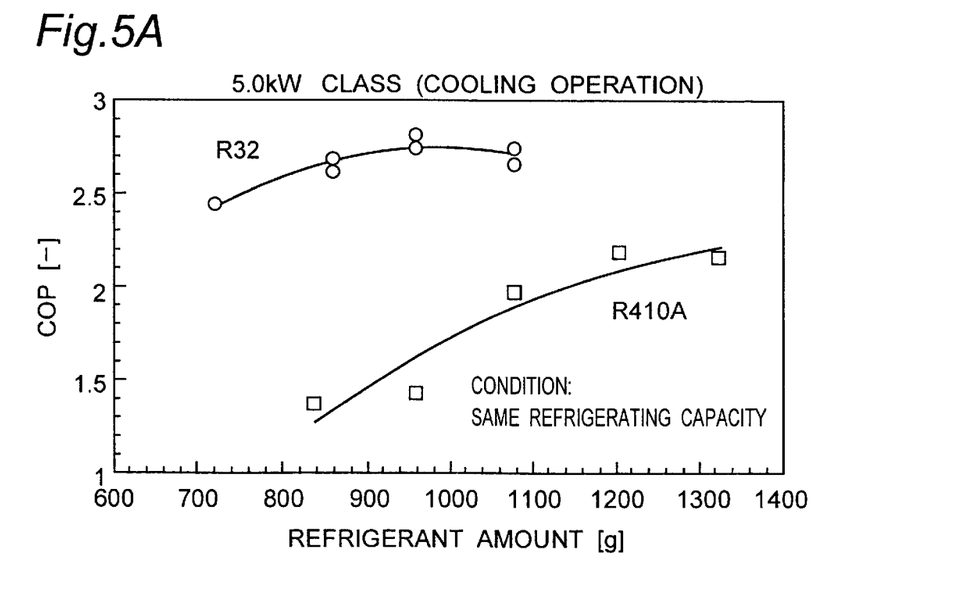
FIG. 5A shows results upon a cooling operation.

The present invention was accomplished based on a finding by the inventors of the present invention that a tendency that a COP of a refrigerating device varies depending on the refrigerant amount (the whole amount filled in the refrigerant circuit) largely differs depending on the kind of the refrigerant, particularly between R32 and the other refrigerants such as R410A and the like. Specifically, when R410A is used for example, as shown in FIG. 5A, there seems to be a tendency that the COP gradually rises as the refrigerant amount increases, and that the COP reaches to a saturated point in the shown range. On the other hand, when R32 is used, there is a tendency that the COP shows a peak in response to the change in the refrigerant amount, and that the COP rapidly lowers as soon as the refrigerant amount is out of the range where the peak is obtained. The reason why a higher COP could not be conventionally obtained in the case of using R32 in comparison with the case of using R410A is that R32 was used in a range where the refrigerant amount was relatively large (1200–1300 g in the example of FIG. 5A). Here, attention should be paid to the fact that the peak value of the COP when R32 is used and the refrigerant amount is changed is much higher than the COP when R410A is used in an optimal refrigerant amount (1300 g in the example of FIG. 5A). Therefore, there is a possibility that the size of a heat exchanger serving as a condenser can be reduced by using R32 in a range of a COP equivalent to or higher than a conventional COP in the case of using R22.

The present invention provides a refrigerating device circulating R32 in a refrigerant circuit as a refrigerant to perform a refrigerating cycle, the refrigerating device comprising: a compressor in the refrigerant circuit; a first heat exchanger serving as a condenser; an expansion means; and a second heat exchanger serving as an evaporator, wherein a ratio m of an internal volume (Vout) of the first heat exchanger to an internal volume (Vin) of the second heat exchanger is set to be in a range of $0.7 \leq m \leq 1.5$.

In the refrigerating device of the present invention, R32 is used as a refrigerant, and the ratio m (=Vout/Vin) of the internal volume (Vout) of the first heat exchanger serving as a condenser to the internal volume (Vin) of the second heat exchanger serving as an evaporator is set to be in the range of $0.7 \leq m \leq 1.5$. Consequently, the internal volume of the first heat exchanger serving as a condenser, and therefore, the size of the first heat exchanger are reduced in comparison with a conventional case, particularly, where R410A is used. Therefore, this device has advantages in costs and product size. Furthermore, as described later, a COP which is equivalent to or higher than a conventional COP level when R22 is used can be obtained. Furthermore, even when a refrigerant is circulated in a direction opposite to a refrigerating cycle to perform a heat pump cycle as in the case of an air conditioner, the optimal amount values of the refrigerant filled in the refrigerant circuit at the time of cooling and heating are closer when R32 is used in comparison with a conventional case (R22 or R410A is used) as described later. Therefore, the refrigerant circuit does not need to include a large-size liquid receiver and a large-size vapor-liquid separator (accumulator), and hence this apparatus has advantages in costs and product size.

In one embodiment of the present invention, as the refrigerant, a mixed refrigerant containing at least 70% by weight of R32 is used.

The principle of the present invention is applied not only to the single R32 refrigerant, but also to the mixed refrigerant containing at least 70% by weight of R32, and the same operational effects as the above can be obtained.

BRIEF DESCRIPTION OF DRAWINGS

FIGS. 5A and 5B show results of measurement of a COP when R32 is used as a refrigerant and a COP when R410A is used, while a Refrigerating capacity is 5.0 kW, the refrigerant amount (total amount filled in the refrigerant circuit) is changed.

FIGS. 7A and 7B show COPs of R32 and R410A with respect to their refrigerant amounts (total amount filled in the refrigerant circuit) by using the peak of R410A as a reference when the refrigerating capacity is 2.8 kW.

FIGS. 8A and 8B show COPs of R32 with respect to its refrigerant amount (total amount filled in the refrigerant circuit) by using the peak of R410A as a reference when the refrigerating capacity is 2.5 kW.

BEST MODE FOR CARRYING OUT THE INVENTION

Hereafter, embodiments of the refrigerating device of the present invention will be explained in detail with reference to accompanying drawings.

Figure 6:
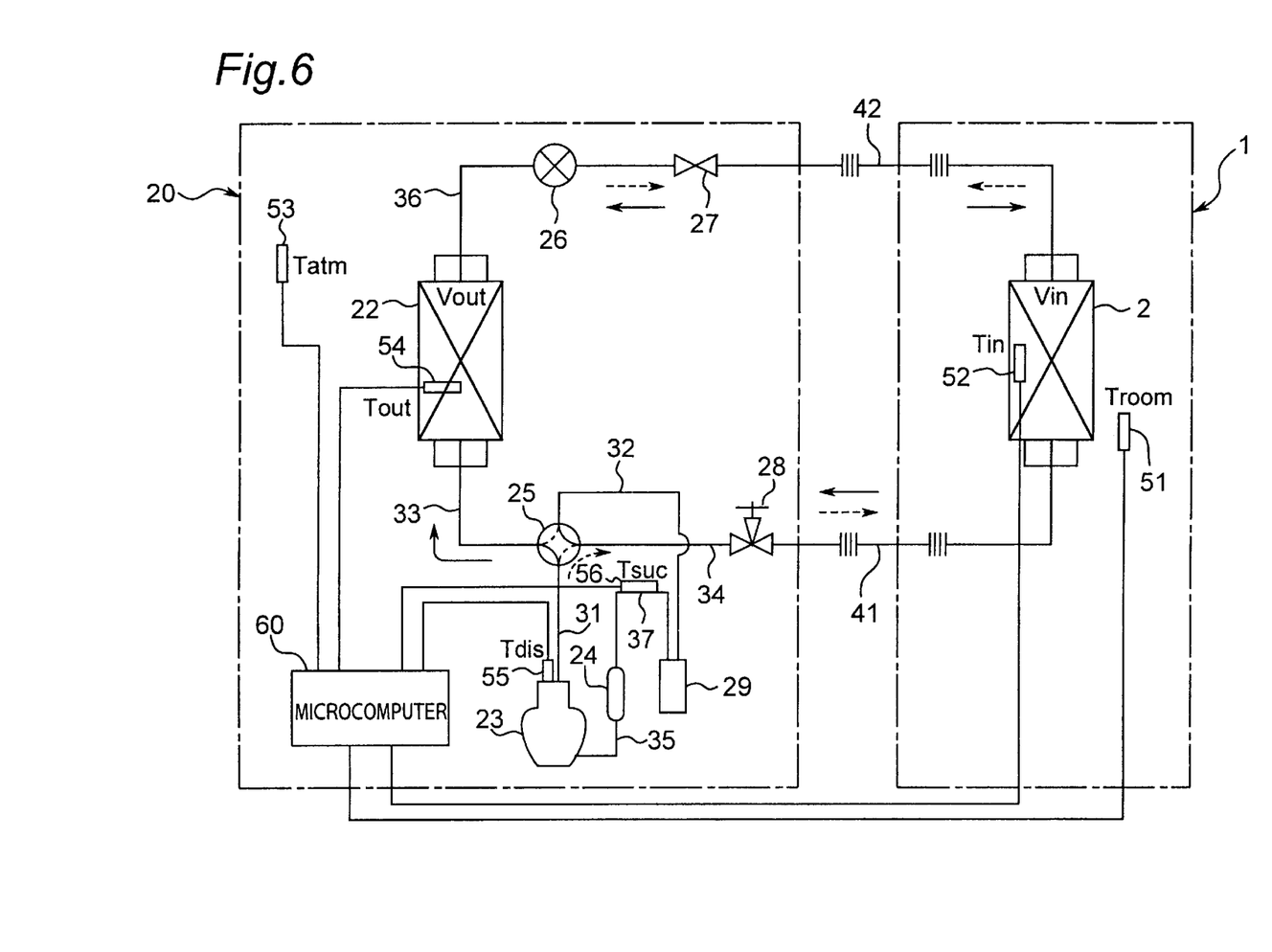
FIG. 6 shows a schematic configuration of an air conditioner for explaining the present invention.

FIG. 6 shows a schematic configuration of an air conditioner for explaining the present invention. In this air conditioner, a refrigerant circuit is configured by connecting an outdoor unit 20 and an indoor unit 1 with refrigerant pipes 41, 42, and R32 is circulated in the refrigerant circuit as a refrigerant. An indoor heat exchanger 2 as a second heat exchanger is housed in the indoor unit 1. Meanwhile, a compressor 23 for compressing and discharging the refrigerant (R32), a four-way switching valve 25 for switching refrigerant flow passages, an outdoor heat exchanger 22 as a first heat exchanger, a motor-operated expansion valve 26, an accumulator 24 for separating the returned refrigerant into a gas and a liquid, a receiver 29 for adjusting a refrigerant amount for cooling or heating and a microcomputer 60 for controlling an operation of the air conditioner are housed in the outdoor unit 20.

At the time of a cooling operation where a refrigerating cycle is performed, by switching the four-way switching valve 25, as shown as solid lines in FIG. 6, the refrigerant discharged from the compressor 23 is transferred to the outdoor heat exchanger 22 serving as a condenser through a pipe 31, the four-way switching valve 25 and a pipe 33. The refrigerant condensed in this outdoor heat exchanger 22 is transferred to the indoor heat exchanger 2 serving as an evaporator through a pipe 36, the motor-operated expansion valve 26 for expanding the refrigerant by squeezing the flow passage, a throttle valve 27 and a pipe 42. Furthermore, the refrigerant evaporated in the indoor heat exchanger 2 is returned to the compressor 23 through a pipe 41, needle valve 28, pipe 34, four-way switching valve 25, pipe 32, receiver 29, pipe 37, accumulator 24 and pipe 35. Meanwhile, at the time of a heating operation where a heat pump cycle is performed, the four-way switching valve 25 is switched to transfer the refrigerant discharged from the compressor 23 to the indoor heat exchanger 2 serving as a condenser through the pipe 31, four-way switching valve 25, pipe 34, needle valve 28 and pipe 41 as shown with broken lines in FIG. 6. The refrigerant condensed in this indoor heat exchanger 2 is transferred to the outdoor heat exchanger 22 serving as an evaporator through the pipe 42, throttle valve 27, full-power motor-operated expansion valve 26 and pipe 36. The refrigerant evaporated in this outdoor heat exchanger 22 is returned to the compressor 23 through the pipe 33, four-way switching valve 25, pipe 32, receiver 29, pipe 37, accumulator 24 and pipe 35.

The indoor unit 1 is equipped with a temperature sensor 51 for detecting indoor atmosphere temperature Troom and a temperature sensor 52 for detecting temperature Tin of the indoor heat exchanger. Furthermore, the outdoor unit 20 is equipped with a temperature sensor 53 for detecting outdoor atmosphere temperature Tatm, temperature sensor 54 for detecting temperature Tout of outdoor heat exchanger, temperature sensor 55 for detecting discharge temperature Tdis of the compressor and temperature sensor 56 for detecting suction temperature Tsuc of the compressor. The microcomputer 60 controls an operation of the refrigerant circuit based on outputs of these temperature sensors and settings by the user.

In this air conditioner, R32 is used as a refrigerant, and the ratio m (=Vout/Vin) of the internal volume Vout of the outdoor heat exchanger 22 and the internal volume Vin of the indoor heat exchanger 2 is set to be in the range of $0.7 \leq m \leq 1.5$ according to the present invention. In order to change the internal volume of the heat exchanger, it is sufficient to change the inner diameter of a heating tube (the refrigerant passes through the inside thereof) piercing through radiating fins of the heat exchanger. In such a case, the internal volume of the outdoor heat exchanger 22, therefore, the size of the outdoor heat exchanger 22 can be reduced in comparison with a conventional case particularly where R410A is used. Therefore, there are advantages in costs and product size.

Figure 1:
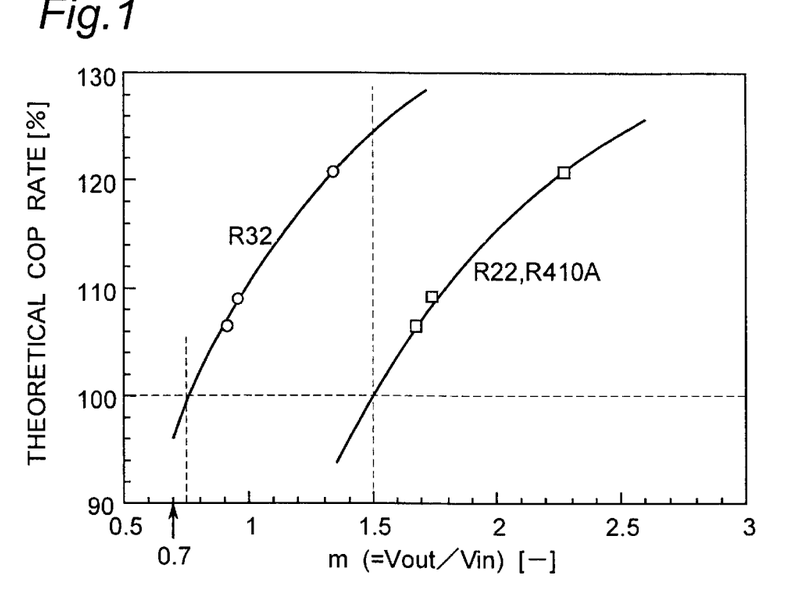
FIG. 1 shows relationship between a theoretical COP and a ratio m (=Vout/Vin) which is a ratio of an internal volume Vout of an outdoor heat exchanger to an internal volume Vin of an indoor heat exchanger, in comparison between a case where R32 is used and m is set to be in the range of $0.7 \leq m \leq 1.5$ according to the present invention and a case where R22 or R410A is used and m is set to be in the range of $1.5 < m \leq 2.6$.
Figure 3A:
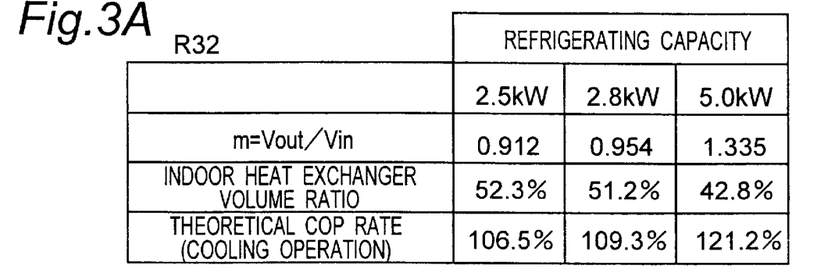
FIGS. 3A and 3B respectively show comparison of various kinds of data between the case where R32 is used and m is set to be in the range of $0.7 \leq m \leq 1.5$ according to the present invention and the case where R22 or R410A is used and m is set to be in the range of $1.5 < m \leq 2.6$.
Figure 3B:
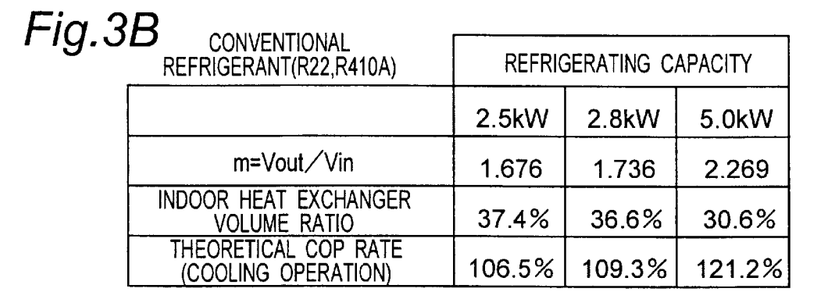

In addition, as shown in FIG. 1, when R32 is used and m is set be in the range of $0.7 \leq m \leq 1.5$, a COP equivalent to or higher than a COP when R22 or R410A is used and m is set to be in the range of $1.5 < m \leq 2.6$ can be obtained. Specifically, as shown in FIGS. 3A and 3B, a COP in the case of using R32 and a COP in the case of using R22 or R410A are compared at a refrigerating capacity of 2.5 kW, 2.8 kW and 5.0 kW, there is a similar tendency in both cases that the COP increases as the m value increases. Theoretical COP at m=0.912, 0.954 and 1.335 in the former case are equal to theoretical COP at m=1.676, 1.763 and 2.269 in the latter case. However, in FIGS. 3A and 3B, the refrigerant amount filled in the refrigerant circuit when R32 is used is set to be 70% by weight of the refrigerant amount filled in the refrigerant circuit when R410A is used. Here, the reason why theoretical COP is used for comparison is that the compressor efficiency needs to be equivalent for evaluation (in the present specification, when COP is simply referred to, this means COP in a real machine unless otherwise specified). It is noted that the method of measuring the Refrigerating capacity (kW) conforms to provision C9612 of in Japan Industrial Standard (JIS).

Figure 4:
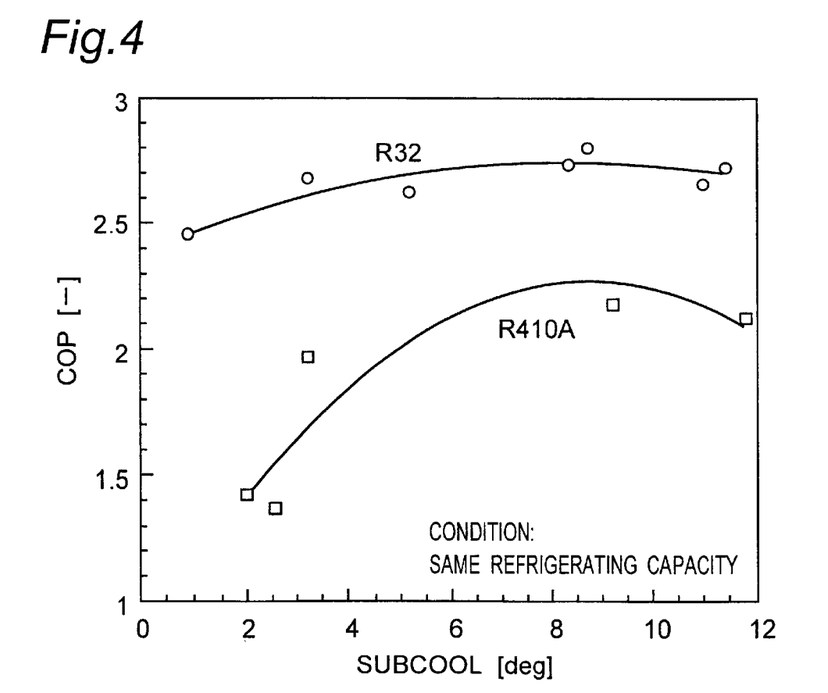
FIG. 4 shows comparison between a COP when R32 is used and a COP when R22 or R410A is used with the same refrigerating capacity when a degree of supercooling (subcool) in an outdoor heat exchanger is changed at the time of a cooling operation.

Even when R32 is thus used and m is set to be small in the range of $0.7 \leq m \leq 1.5$, it is possible to obtain a COP equivalent to or higher than a COP when R22 or R410A is used and m is set to be in the range of $1.5 < m$. This is because it is considered to be that R32 has higher thermal capacity and lower pressure loss compared with R22, R410A or R407C. Therefore, a COP in the case of using R32 does not much lower than that in the case of using R410A or the like even when a degree of supercooling is set to be low, as shown in FIG. 4.

Figure 2:
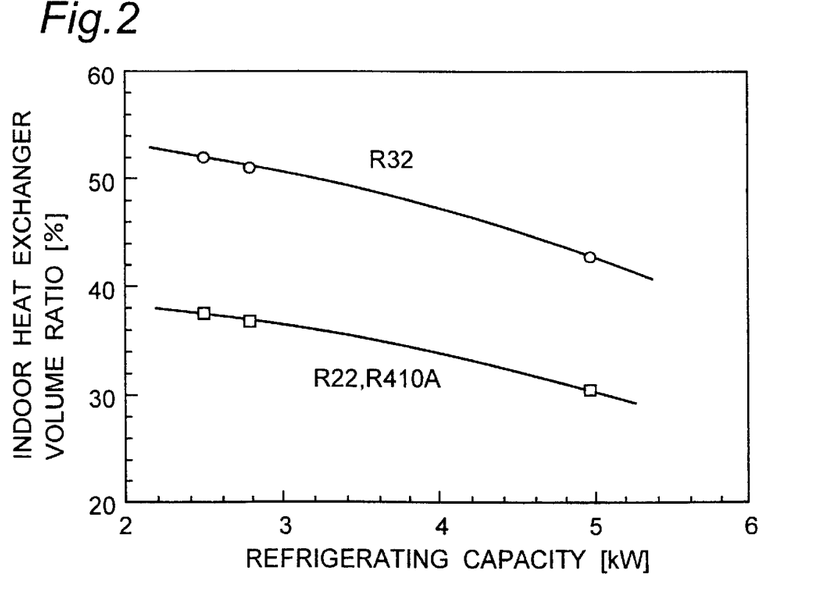
FIG. 2 shows relationship between a refrigerating capacity and an indoor heat exchanger volume ratio in comparison between the case where R32 is used and m is set to be in the range of $0.7 < m < 1.5$ according to the present invention and the case where R22 or R410A is used and m is set to be in the range of $1.5 < m \leq 2.6$.

FIG. 2 shows indoor heat exchanger volume ratios at a refrigerating capacity of 2.5 kW, 2.8 kW and 5.0 kW in comparison between the case of using R32 and the case of using R22 or R410A based on data in FIGS. 3A and 3B. Here, the indoor heat exchanger volume ratio is defined as follows:

> Internal volume of indoor heat exchanger/(internal volume of indoor heat exchanger+internal volume of outdoor heat exchanger)

As shown in FIG. 2, when R32 is used and m is set to be in the range of $0.7 \leq m \leq 1.5$, the indoor heat exchanger volume ratio is 39–54%, while the indoor heat exchanger volume ratio is 30–38% when R22 or R410A is used and m is set to be in the range of $1.5 < m \leq 2.6$.

Figure 5B:
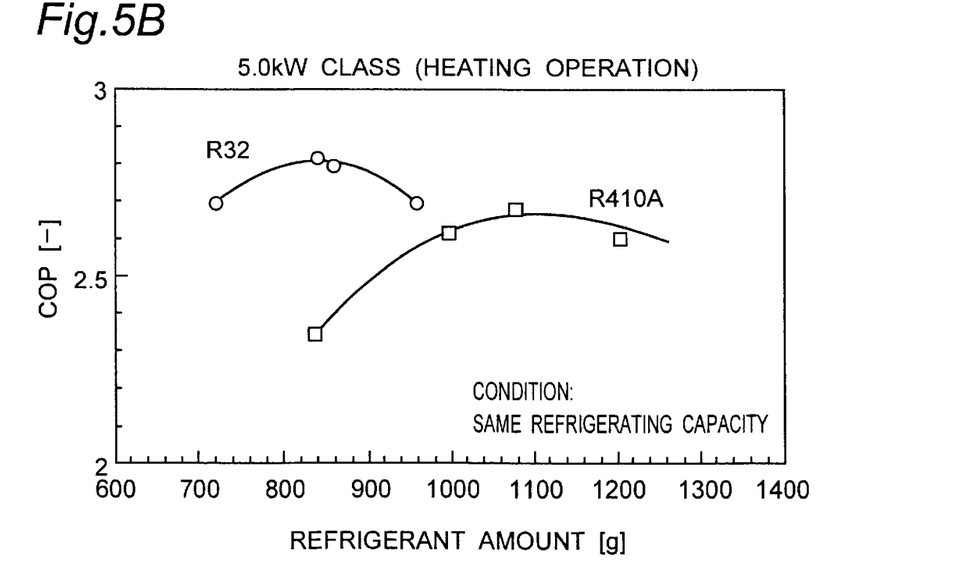
FIG. 5B shows results upon a heating operation.

FIGS. 5A and 5B show relationships between the refrigerant amount (g) and COP at the time of cooling and heating, respectively, when R410A and R32 are used as refrigerants and the refrigerating capacity is 5.0 kW.

When R32 is used, the optimal amount values of the refrigerant filled in the refrigerant circuit at the time of cooling and heating become closer in comparison with a conventional case (R22 or R410A is used) as shown in FIGS. 5A and 5B. Specifically, the optimal refrigerant amount providing a peak of COP when R32 is used is obtained as 960 g at the time of a cooling operation and 840 g at the time of a heating operation. Meanwhile the optimal refrigerant amount when R410A is used is obtained as 1300 g at the time of a cooling operation and 1100 g at the time of a heating operation. As shown in these results, when R32 is used, the ratio between the optimal amount of the refrigerant filled in the refrigerant circuit at the time of cooling and the optimal amount of the refrigerant filled in the refrigerant circuit at the time of heating becomes closer to 1 than that when 410A is used. Therefore, the receiver 29 can be omitted or the accumulator 24 can be made smaller in the refrigerant circuit, thereby resulting in advantages in costs and product size.

Figure 7A:
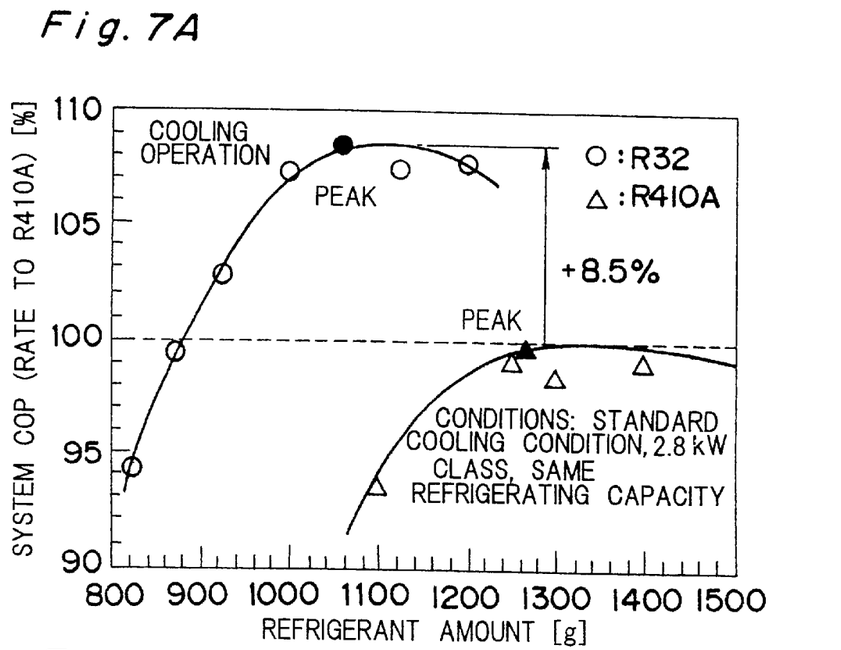
FIG. 7A shows results upon a cooling operation.
Figure 7B:
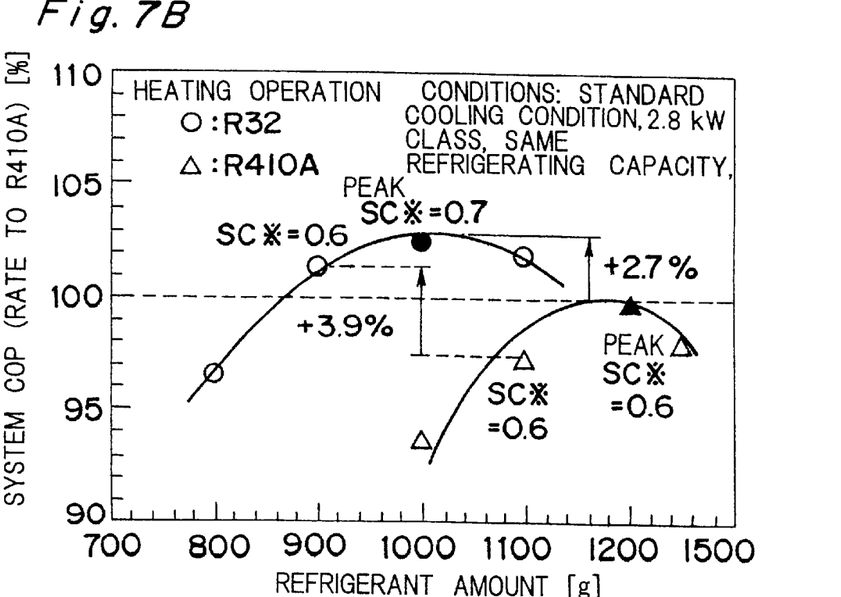
FIG. 7B shows results upon a heating operation.

FIGS. 7A and 7B show relationship between the refrigerant amount (g) and the system COP (%) at the time of cooling and heating, respectively, when R410A and R32 are used as refrigerant and the refrigerating capacity is 2.8 kW. As shown in FIGS. 7A and 7B, R32 has COPs higher than those of R410A at a refrigerating capacity of 2.8 kW similarly to that of 5.0 kW, and R32 has less difference between the optimal amount value of the refrigerant filled in the refrigerant circuit at the time of cooling and that at the time of heating in comparison with R410A. Specifically, the optimal refrigerant amount providing a peak of COP when R32 is used is obtained as 1100 g at the time of a cooling operation and 1000 g at the time of a heating operation. Meanwhile, the optimal refrigerant amount when R410A is used is obtained as 1340 g at the time of a cooling operation and 1180 g at the time of a heating operation. As shown in these results, when R32 is used, the ratio of the optimal amount of the refrigerant filled in the refrigerant circuit at the time of cooling and the optimal amount of the refrigerant filled in the refrigerant circuit at the time of heating becomes closer to 1 in comparison with when R410A is used.

Figure 8A:
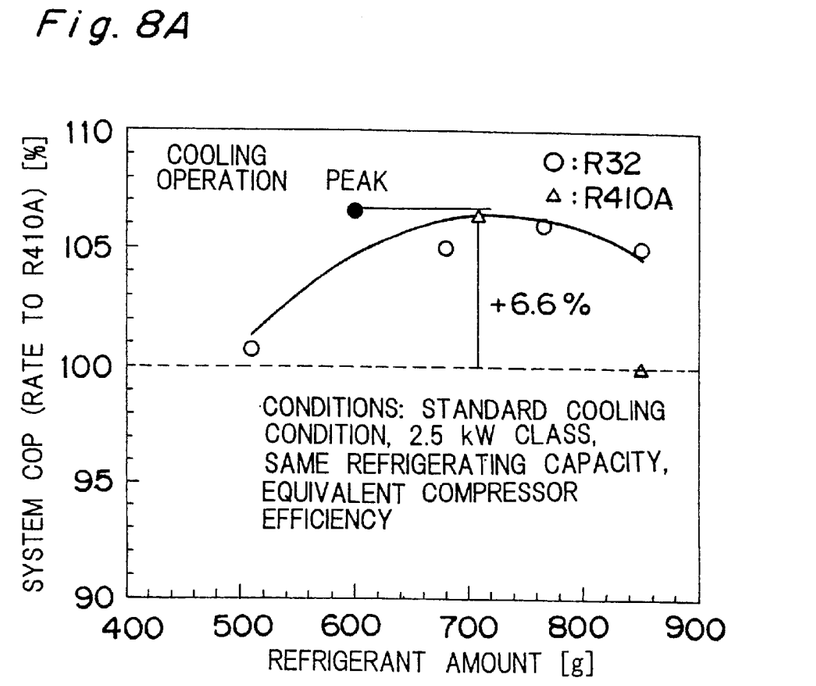
FIG. 8A shows results upon a cooling operation.
Figure 8B:
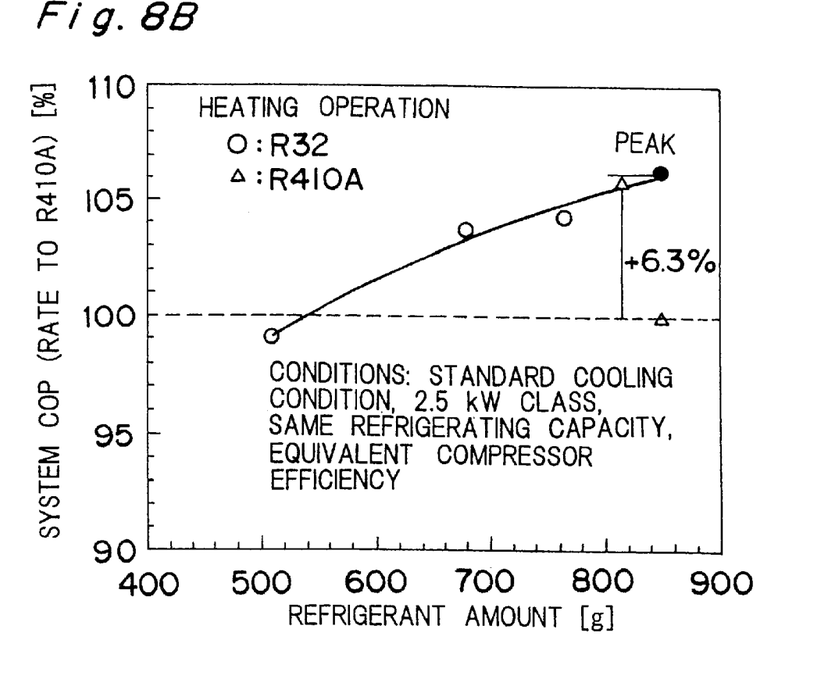
FIG. 8B shows results upon a heating operation.

Furthermore, FIGS. 8A and 8B show relationship between the refrigerant amount (g) and the system COP (%) at the time of cooling and heating, respectively, when R410A and R32 are used as refrigerant and the refrigerating capacity is 2.5 kW. It is confirmed that at a refrigerating capacity of 2.5 kW, similarly to the cases of 2.8 kW and 5.0 kW, R32 has less difference between the optimal amount values of the refrigerant filled in the refrigerant circuit at the time cooling and heating in comparison with the case of R410A.

Therefore, when the refrigerating capacity is 2.5 kW or 2.8 kW as in the case of 5.0 kW, the receiver 29 can be omitted or the accumulator 24 can be made smaller in the refrigerant circuit, thereby resulting in advantages in costs and product size.

It is noted that an air conditioner has been explained in this embodiment, but the present invention is not limited to this embodiment. The present invention can be widely applied to refrigerating devices using R32 as a refrigerant to perform a refrigerating cycle.

Furthermore, naturally, the principle of the present invention is applied not only to a single R32 refrigerant, but extended to a mixed refrigerant containing at least 70% by weight of R32 and exhibits the same operational effects. As a refrigerant mixed with R32, a fluorine refrigerant or a natural refrigerant may be used. Examples of the natural refrigerant include propane, butane, $CO_2$, ammonia and so forth. Such mixed refrigerants include, for example, a refrigerant containing 70–90% by weight of R32 and $CO_2$ as a remaining component. Furthermore, when an old type refrigerating device is filled with R32 as an alternative refrigerant, that is, when a so-called retrofit is performed or an R22 machine is maintained, a refrigerant containing 70–90% by weight of R32 and R22 as a remaining component can be used as a mixed refrigerant.

Furthermore, a mixture of R32 and R125 can be considered as a mixed refrigerant. In the mixed refrigerant of R32 and R125, a region containing up to 70% by weight of R32 is an azeotropic region where the liquid composition and the generated vapor composition are the same. A region higher than that becomes a non-azeotropic region. As the R32 content increases, characteristics of R32 appear more clearly and more remarkably in the non-azeotropic region.

Figure 9:
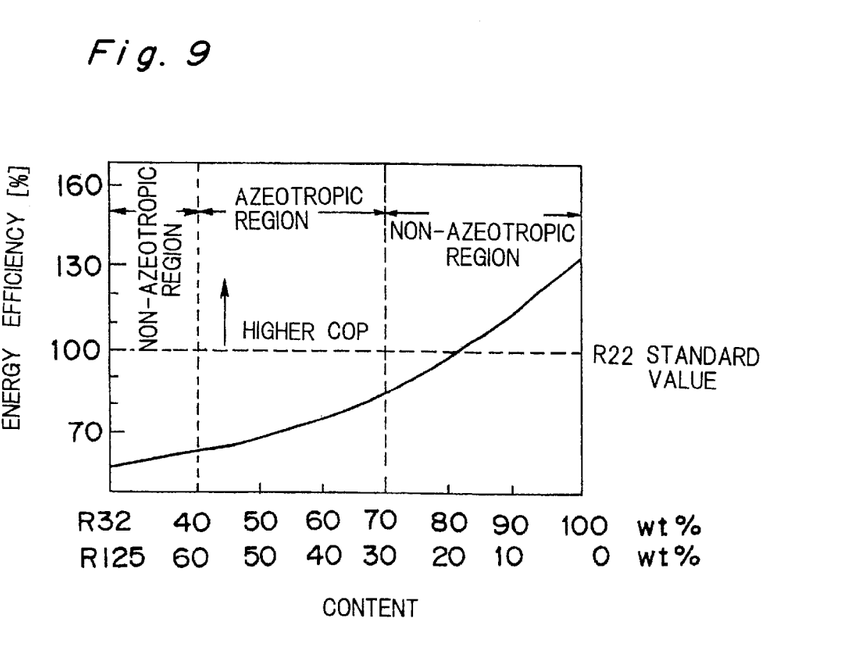
FIG. 9 shows relationship between energy efficiency and content of R32 in a mixed refrigerant of R32 and R125.

FIG. 9 shows a relationship between the R32 content in a refrigerant mixed with R125 and energy efficiency. When the R32 content is 70% by weight or higher, the energy efficiency significantly rises. When the R32 content exceeds about 80% by weight, its energy efficiency surpasses that of R22. That is, when the R32 content is 70% by weight or higher, a high COP can be obtained.

Thus, a single R32 refrigerant and a mixed refrigerant containing at least 70% by weight of R32 have a COP substantially equivalent to or higher than that of a conventional refrigerant such as R22 or the like as shown in FIGS. 1, 5A and 5B. Furthermore, as described above, the global warming potential GWP of R32 is about 1/3 of that of a conventional refrigerant such as R22 or the like, which is extremely low. Therefore, the Total Equivalent Warming Impact (TEWI) of R32, which is represented in an equation including an inverse number of COP and GWP, is lower than that of R22 or R410A (lowering rate: 10–20%) and R32 shows an excellent characteristic against global warming.

Thus, since an R32 refrigerant and a mixed refrigerant containing at least 70% by weight of R32 not only do not deplete the ozone layer, but also have a low global warming potential GWP, a low total equivalent warming impact TEWI and a high coefficient of performance (COP), these are energy saving type refrigerants responding to global warming.

As is evident from the above, the refrigerating device of the present invention is of an energy saving type responding to global warming by using R32 as a refrigerant. Moreover, since the ratio m (=Vout/Vin) of the internal volume (Vout) of the first heat exchanger serving as a condenser and the internal volume (Vin) of the second heat exchanger serving as an evaporator is set to be in the range of $0.7 \leq m \leq 1.5$, the size of the first heat exchanger can be reduced in comparison with a conventional device while a COP equivalent to or higher than a conventional COP level is obtained.

Furthermore, since the refrigerating device of the present invention uses a mixed refrigerant containing at least 70% by weight of R32 as the refrigerant, the same operational effects as the above can be obtained.

What is claimed is:

1. A refrigerating device circulating R32 in a refrigerant circuit as a refrigerant to perform a refrigerating cycle, the refrigerating device comprising:

a compressor (23) in the refrigerant circuit;

a first heat exchanger (22) serving as a condenser;

an expansion means (26); and a second heat exchanger (2) serving as an evaporator, wherein a ratio m of an internal volume (Vout) of the first heat exchanger (22) to an internal volume (Vin) of the second heat exchanger (2) is set to be in a range of $0.7 \leq m \leq 1.5$.

2. The refrigerating device according to claim 1, wherein as the refrigerant, a mixed refrigerant containing at least 70% by weight of R32 is used.

* * * * *